July 27, 1937.  G. H. RAREY  2,087,996
TELESCOPE MOUNTING
Filed May 22, 1936
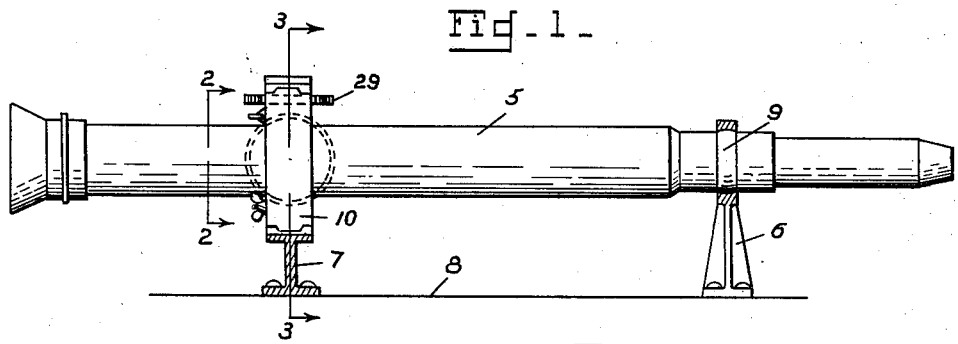
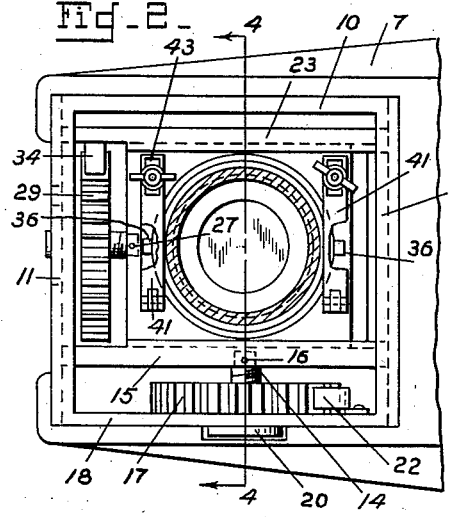
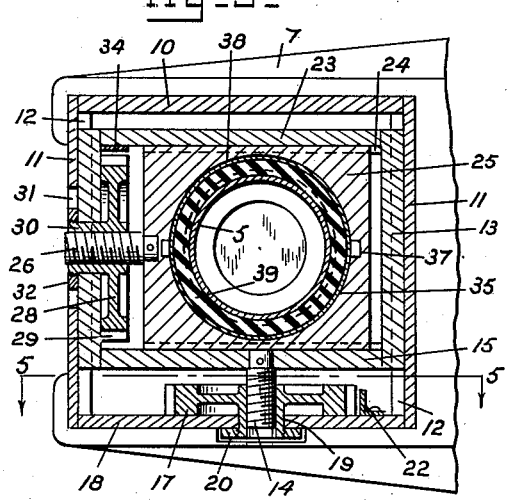
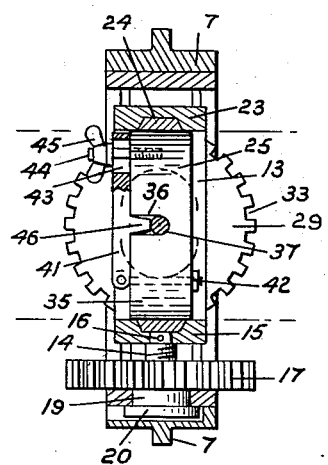
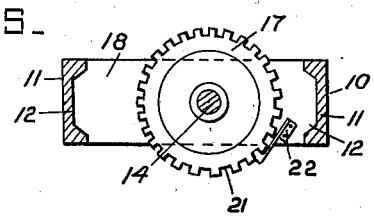
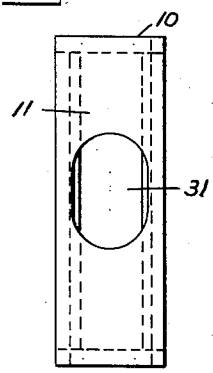
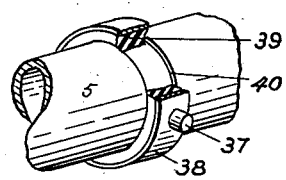
Inventor
George H. Rarey
By W. N. Roach
Attorney Patented July 27, 1937

2,087,996

UNITED STATES PATENT OFFICE 2,087,996

TELESCOPE MOUNTING

George H. Rarey, U. S. Army, Fort Benning, Ga.

Application May 22, 1936, Serial No. 81,213

4 Claims. (Cl. 33—50)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a telescope mounting especially adapted for guns.

A telescope employed on a gun is usually mounted for adjustment so that its axis may be moved into parallelism with the axis of bore of the gun barrel. Due to the conditions of service the telescope must be frequently removed for cleaning and it is generally removed during transportation of the gun.

The purpose of this invention is to provide a simple mounting which may be readily adjusted and which will permit application and removal of the telescope without disturbance of the adjustment of the mounting.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a plan view of a telescope and mounting.

Figs. 2 and 3 are sectional views on the corresponding lines of Fig. 1.

Fig. 4 is a sectional view generally on the line 4—4 of Fig. 2.

Fig. 5 is a reduced sectional view on the line 5—5 of Fig. 3.

Fig. 6 is a view in side elevation of the fixed frame.

Fig. 7 is a perspective of a portion of the telescope with parts in section.

Referring to the drawing by characters of reference, there is shown a telescope formed of the usual tube 5 adapted to be mounted in a front bracket 6 and a rear bracket 7 attached to a gun 8. A collar 9 on the tube 5 has a rounded surface engaging the front bracket 6 whereby the tube is capable of pivotal movement.

The rear bracket 7 is formed with an opening for receiving a rectangular frame 10 (Fig. 3) which is fixed in place in any suitable manner. The stiles 11—11 of the frame 10 are formed on their inside surfaces with grooves 12—12 for mounting a sliding frame 13 (Fig. 3). A bolt 14 fixed to the bottom rail 15 of the frame 13 by a pin 16 is threadedly inserted in a handwheel 17. This handwheel rests on the bottom rail 18 of the fixed frame 10 and extends beyond the side edges so as to be readily grasped. The hub 19 of the handwheel extends through the bottom rail 18 and receives a nut 20 whereby it is held against axial displacement while being free to rotate and cause displacement of the sliding frame 13. The periphery of the handwheel is formed with notches 21 for receiving the free end of a spring latch 22 carried by the bottom rail 18 of the fixed frame 10.

The inner surfaces of the bottom rail 15 and top rail 23 of the sliding frame 13 are formed with grooves 24—24 for mounting a horizontally sliding block 25 (Fig. 3). A bolt 26 fixed to the left side of the block by a pin 27 is threadedly inserted in a handwheel 28. This handwheel rests against the left stile 29 of the sliding frame 13 and extends beyond the side edges so as to be readily grasped. The hub 30 of the hand-wheel extends through the stile 29 of the slidable frame and through a slot 31 in the left stile 11 of the fixed frame and receives a nut 32 whereby it is free to rotate and be displaced vertically with the sliding frame but is held against axial displacement. The handwheel 28 is formed with notches 33 for receiving a spring latch 34 carried by the top rail 23 of the sliding frame.

The sliding frame 25 is formed with a circular opening 35 for receiving the telescope. The wall of the opening is provided with a pair of opposite grooves 36—36 blind at their forward ends and adapted to receive opposite studs 37—37 fixed on a band 38 on the telescope. The engagement of the studs in the grooves of the block serves to hold the telescope against forward movement as well as rotational displacement.

A rubber ring 39 fast to the inside of the band fits in an annular groove 40 in the tube 5 of the telescope. The band and ring unit constituting a collar is moved into position by being forced over the front part of the tube 5.

A pair of bars 41—41 arranged oppositely to one another on the rear side of the sliding block are each pivotally mounted on one of a pair of bolts 42—42 passing through the lower part of the sliding block. The upper part of each bar is provided with an aperture 43 adapted to receive a bolt 44 threadedly attached to the sliding block. A wing nut 45 on the outer end of each bolt serves to retain the corresponding bar in place against the block. Each bar is provided with a lug 46 adapted to enter one of the grooves 36 and engage and confine a stud 37 of the telescope. The bars also engage the collar of the telescope.

When the telescope is mounted in the front bracket 6 and in the sliding block 25 of the rear bracket 7 it may be moved into adjustment with the gun by acting on the handwheels 17 and 28 to displace the rear part of the telescope about the collar 9 as a pivot. The provision of the rubber ring permits this adjusting movement without placing a strain upon the telescope or the sliding block.

The position of the sliding block determines the position of adjustment of the telescope and the position of the block is not disturbed when the bars 41 are lowered and the telescope removed.

I claim:

1. The combination with a telescope having an annular groove, a collar including a rubber ring fitting in the groove, and opposite studs on the collar, of a bracket, a frame fixed in the bracket, a second frame mounted for vertically sliding movement in the fixed frame, means for moving the sliding frame, a block mounted for horizontally sliding movement in the slidable frame, said block having an opening for receiving the collar of the telescope, the wall of the opening provided with opposite grooves blind at one end for receiving the studs of the collar, a pair of bars pivotally mounted on the block, a lug on each bar adapted to enter a groove in the block and confine the collar stud in said groove, means for clamping each bar to the block to confine the collar of the telescope and means for moving the block.

2. The combination with a telescope, a collar on the telescope including a resilient element and studs on the collar, of a support, a block carried by the support, means for moving the block on intersecting paths, said block having an opening for receiving the collar of the telescope, the wall of the opening provided with grooves blind at one end for receiving the studs of the collar, bars pivotally mounted on the block, a lug on each bar adapted to enter a groove in the block and confine the collar stud in said groove and means for clamping each bar to the block to confine the collar of the telescope.

3. In a telescope mounting, a support, a frame fixed in the support, a second frame mounted for vertically sliding movement in the fixed frame, a handwheel carried by the fixed frame, a bolt fixed to the sliding frame and threadedly engaging the handwheel, a block mounted for horizontally sliding movement in the sliding frame, a handwheel carried by the sliding frame, a bolt fixed to the block and threadedly engaging the handwheel carried by the sliding frame, and means on the block for mounting a telescope.

4. In combination, a support, a block carried by the support and having an opening and grooves in the wall of the opening, means for moving the block on intersecting paths, a telescope passing through the opening in the block, a ring of resilient material embracing the telescope, a metal band surrounding the resilient ring and fixed thereto, studs on opposite sides of the band and disposed in the grooves of the block, means for retaining the studs in the grooves and means for pivotally mounting the telescope at a position distant from the support.

GEORGE H. RAREY.